United States Patent
Kouvelas et al.

(10) Patent No.: US 8,230,092 B2
(45) Date of Patent: *Jul. 24, 2012

(54) MULTICAST-ROUTING-PROTOCOL-INDEPENDENT REALIZATION OF IP MULTICAST FORWARDING

(75) Inventors: Isidor Kouvelas, Burlingame, CA (US); Lorenzo Vicisano, Oakland, CA (US); Tony Speakman, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 12/590,060

(22) Filed: Nov. 2, 2009

(65) Prior Publication Data
US 2010/0049860 A1 Feb. 25, 2010

Related U.S. Application Data

(62) Division of application No. 10/376,006, filed on Feb. 28, 2003, now Pat. No. 7,644,177.

(51) Int. Cl.
*G06F 15/173* (2006.01)

(52) U.S. Cl. ........ 709/230; 709/238; 709/243; 709/228; 709/232

(58) Field of Classification Search ................. 709/230, 709/232, 228, 238, 243
See application file for complete search history.

(56) References Cited

U.S. PATENT DOCUMENTS

| | | | |
|---|---|---|---|
| 6,347,090 B1 | 2/2002 | Ooms et al. | |
| 6,484,209 B1 | 11/2002 | Momirov | |
| 6,597,703 B1 | 7/2003 | Li et al. | |
| 6,615,336 B1 | 9/2003 | Chen et al. | |
| 6,658,481 B1 * | 12/2003 | Basso et al. | 709/243 |
| 6,711,163 B1 * | 3/2004 | Reid et al. | 370/390 |
| 6,772,222 B1 | 8/2004 | Gallo et al. | |
| 7,126,952 B2 * | 10/2006 | Hooper et al. | 370/401 |
| 2002/0126671 A1 | 9/2002 | Ellis et al. | |
| 2003/0014391 A1 | 1/2003 | Evans et al. | |

FOREIGN PATENT DOCUMENTS

| EP | 1035685 | 9/2000 |
|---|---|---|
| WO | WO 00/69119 A | 11/2000 |

OTHER PUBLICATIONS

S. Deering "Host for IP Multicasting," RFC 1112, Internet Engineering Task Force, Aug. 1989.
W. Fenner "Internet Group Management Protocol, Version 2," RFC 2236, Internet Enginnering Task Force, Feb. 1997.
T. Bates et al. "Multiprotocol Extensions for BGP-4." RFC 2283, Internet Engineering Task Force, Feb. 1998.
D. Estrin et al. "Protocol Independent Multicast-Sparse Mode (PIM-SM): Protocol Specification," RFC 2362, Internet Engineering Task Force, Jun. 1998.

(Continued)

*Primary Examiner* — Barbara Burgess
(74) *Attorney, Agent, or Firm* — Cindy Kaplan

(57) ABSTRACT

Improved systems and methods for implementing data-driven protocols are provided. In one embodiment, improved implementations of multicast routing protocols are provided. Separation between multicast forwarding and control elements are provided by use of a powerful yet simple application program interface (API) for inter-module communication. The API is multicast-routing-protocol-independent and can be used to express the forwarding state of any existing multicast protocol. Efficient platform-specific implementations are facilitated.

20 Claims, 5 Drawing Sheets

OTHER PUBLICATIONS

B. Fenner et al. Protocol Independent Multicast-Sparce Mode (PIM-SM): Protocol Specification (Revised), Internet Draft, Internet Engineering Task Force, Mar. 1, 2002.

M. Handley et al. Bi-directional Protocol Independent Multicast (BIDIR-PIM), Internet Draft, Internet Engineering Task Force, Jun. 2002.

* cited by examiner 224.1.1.2.   IA, DS, DSS, C, X
10.1.1.3/64

IF0   A, F, NS, NSS, SP, IC
IF1   A, F, NS, NSS, SP, IC
IF2   A, F, NS, NSS, SP, IC

Fig. 4

MULTICAST-ROUTING-PROTOCOL-INDEPENDENT REALIZATION OF IP MULTICAST FORWARDING

STATEMENT OF RELATED APPLICATION

The present application is a divisional of U.S. patent application Ser. No. 10/376,006, filed Feb. 28, 2003, the contents of which are incorporated by reference herein for all purposes.

BACKGROUND

The present invention relates to data networking, and in one embodiment, more particularly to data-networking protocols.

Traditional Internet Protocol (IP) communication allows a host to send packets to a single host (unicast transmission) or to all hosts (broadcast transmission). To support a demand to provide applications such as audio and video conference calls, audio broadcasting, and video broadcasting that involve high data rate transmission to multiple hosts, a third routing technique has evolved, multicast routing. In multicast routing, a host sends packets to a subset of all hosts as a group transmission. Multicast routing protocols have been developed to conserve bandwidth by minimizing duplication of packets. To achieve maximum efficiency delivery of data, rather than being replicated at the source, multicast packets are replicated in a network at the point where paths to multiple receivers diverge.

In large part, multicast routing protocols rely on the same underlying Internet infrastructure that supports unicast routing. One key difference is that whereas unicast routing is generally based on a destination IP address of the packet, multicast routing protocols typically make forwarding decisions based on a group address that identifies a group of intended recipients and possibly also on an address of the packet source.

There are, however, important differences between unicast and multicast operation besides the nature of the addresses used. Unicast forwarding is a simpler process involving a route look-up for the destination IP address of the packet being forwarded. The look-up returns a next-hop node and a forwarding interface used to get to the next hop. A very important characteristic of the unicast forwarding process is the possibility of performing the route look-up in a pre-computed database called the FIB. As far as the forwarding process is concerned, during the route look-up the FIB can be considered static. Over a longer time scale, the FIB contents will change as routing protocols convey updates resulting from changes in network connectivity and configuration.

However, the assumption that the FIB remains static during a particular route look-up and does not change in response to receipt of a packet to be forwarded allows for a highly beneficial modularization of the router architecture. A high speed forwarding engine performs the route look-ups and takes action based on the results. A routing processor implements control plane functionality by populating the FIB and modifying its contents as network connectivity and configuration change.

By contrast, however, multicast routing implementations cannot currently take advantage of this type of modularization. Most multicast routing protocols in use today are data driven. They use the reception of multicast packets to be forwarded to infer portions of the current network topology used to forward packets including the very packets from whose receipt topology has been inferred. Receipt of a multicast packet can be interpreted as an event signal to modify the contents of a multicast FIB (MFIB). The resulting MFIB modification may effect the handling of the received packet that caused the modification.

Therefore, instead of a crisp modularization between the multicast forwarding engine and the routing processor that operates the multicast protocols, there is a highly complex interaction between these elements. The forwarding engine maintains some awareness of protocol state. Also, packets that affect multicast routing state may not be fully handled immediately by the forwarding engine alone but may first be transferred to the routing processor.

This lack of separation between control and forwarding greatly complicates the design of multicast forwarding engines. Furthermore, changes in multicast routing protocol operation require changes to the implementation of the forwarding engine and not just the routing processor. Also, the need to transfer certain multicast packets to the routing processor via what is typically a relatively low bandwidth connection increases packet handling latency.

What is needed are improved systems and methods for handling data-driven protocols such as multicast routing protocols.

SUMMARY

By virtue of embodiments of the present invention, improved systems and methods for implementing data-driven protocols are provided. In one embodiment, improved implementations of multicast routing protocols are provided. Separation between multicast forwarding and control elements are provided by use of a powerful yet simple application program interface (API) for inter-module communication. The API is multicast-routing-protocol-independent and can be used to express the forwarding state of any existing multicast protocol. Efficient platform-specific implementations are facilitated.

A first aspect of the present invention provides a method for operating a forwarding engine to handle multicast packets. The method includes: providing a multicast forwarding table accessible to the forwarding engine, providing multicast operation flags in entries of the multicast forwarding table, upon receipt of a multicast packet, identifying a matching entry in the multicast forwarding table based on an address of the multicast packet, and selecting, without awareness of multicast protocol state, a disposition of the multicast packet based on examination of one or more of the multicast operation flags in the identified entry.

A second aspect of the present invention provides a method of operating a network device to forward information. The method includes: providing a data routing protocol that is data driven, employing a forwarding engine to select a disposition of received packets based on at least one flag maintained by the forwarding engine, wherein the forwarding engine is unaware of protocol state for the data routing protocol, and signaling from the forwarding engine to a control plane processor to facilitate maintenance of protocol state for the data routing protocol at the control plane processor.

A third aspect of the present invention provides apparatus for handling multicast packets. The apparatus includes: a forwarding engine that 1) stores a multicast forwarding table having entries holding multicast operation flags, 2) upon receipt of a multicast packet, identifies a matching entry in the multicast forwarding table based on address of the packet, and 3) selects without awareness of multicast routing protocol state, a disposition of the multicast packet, and a routing processor modularly distinct from the forwarding engine that maintains the protocol state.

Further understanding of the nature and advantages of the inventions herein may be realized by reference to the remaining portions of the specification and the attached drawings.

BRIEF DESCRIPTION OF THE DRAWINGS

FIG. 4 depicts an entry in the MFIB of FIG. 3 according to one embodiment of the present invention.

DESCRIPTION OF SPECIFIC EMBODIMENTS

Figure 1:
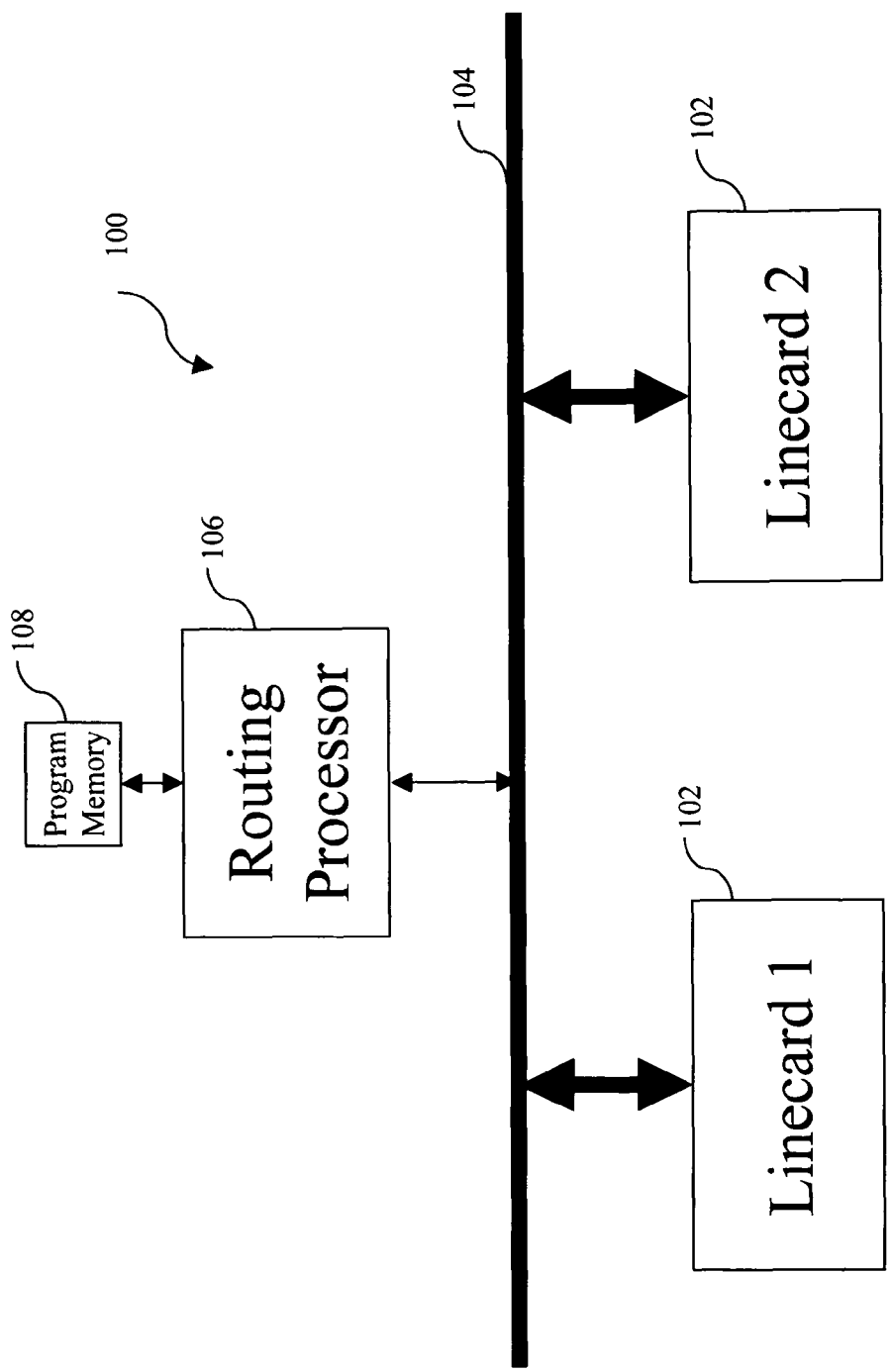
FIG. 1 depicts a network device according to one embodiment of the present invention.

The present invention may be applied to data networks including data networks that employ data-driven protocols. In a particular implementation to be described herein, the present invention may be applied to implementing multicast routing schemes.

Multicast Routine Principles

A brief discussion of multicast routing fundamentals will help introduce concepts of the present invention. Further details of multicast routing protocol operation may be found in the following documents, the contents of which are herein incorporated by reference in their entirety for all purposes.

Deering, "Host Extensions for IP Multicasting," Request for Comments 1112, Internet Engineering Task Force, August 1989.

Fenner, "Internet Group Management Protocol, Version 2," Request for Comments 2236, Internet Engineering Task Force, November 1997.

Cain, et al., "Internet Group Management Protocol, Version 3," Request for Comments 3376, Internet Engineering Task Force, October 2002.

Bates, et al. "Multiprotocol Extensions for BGP-4," Request for Comments 2283, Internet Engineering Task Force, February 1998.

Estrin, et al. "Protocol Independent Multicast-Sparse Mode (PIM-SM): Protocol Specification," Request for Comments 2362, Internet Engineering Task Force, June 1998.

Handley, et al., "Bi-directional Protocol Independent Multicast (BIDIR-PIM)," Internet Engineering Task Force Internet Draft, June 2002.

Fenner, et al., "Protocol Independent Multicast-Sparse Mode (PIM-SM): Protocol Specification (revised)," Internet Engineering Task Force Internet Draft, March 2002.

Adams, et al., "Protocol Independent Multicast-Dense Mode (PIM-DM): Protocol Specification," Internet Engineering Task Force Internet Draft, October 2002.

Holbrook, et al., "Source Specific Multicast for IP," Internet Engineering Task Force Internet Draft, November 2002.

Many of the above protocol documents relate to a family of multicast protocols referred to as Protocol Independent Multicast (PIM). The present invention will be described with reference to the implementation of PIM but is not limited to this particular multicast protocol suite. For example, the present invention may be applied to Distance-Vector Multicast Routing Protocol (DMVPRP), Multicast Extensions to OSPF (MOSPF) and other multicast protocols.

IP multicast simultaneously delivers a single stream of information to numerous recipients. Multicast packets are replicated in a network at the point where paths diverge to achieve efficient data delivery to multiple receivers. PIM is used to dynamically create a multicast distribution tree to ensure distribution to intended receivers while limiting distribution so that network segments that are not in the path between the source and receivers are not burdened with unnecessary traffic.

Multicast operation is based on the concept of a group. A multicast group is an arbitrary group of receivers that expresses an interest in receiving a particular datastream. Such a group has no physical or geographical boundaries. Hosts that are interested in receiving data flowing to a particular group join the group using Internet Group Management Protocol (IGMP).

An IP multicast address, or a portion thereof, specifies a particular group. In, e.g., IPv4 and IPv6, particular address ranges are reserved for specifying multicast groups.

Multicast-capable routers create distribution trees that control the path that IP multicast traffic takes through the network in order to deliver traffic to all receivers. The two basic types of multicast distribution trees are source trees and shared trees.

In a source tree, the multicast traffic source is the root and the branches form a spanning tree through the network to the receivers. This is also referred to as a shortest path tree (SPT) because the tree typically uses the shortest paths between the source and receiver through the network. A particular SPT is denoted by a (S,G) address where S is the IP address of the source and G is the group address of the group of recipients.

Unlike source trees that have their root at the source, shared trees use a single common root placed at some chosen point in the network. This shared root is called a Rendezvous Point (RP). Because all sources of traffic directed to a particular multicast group use a common shared tree, shared trees are identified by addresses written in (*,G) form. In this wildcard notation, * denotes all sources, and G represents the multicast group.

Both source trees and shared trees are loop-free. Messages are preferably replicated only where the tree branches. Members of multicast groups can join or leave at any time; therefore the distribution trees are dynamically updated. When all the active receivers in a particular branch stop requesting the traffic for a particular multicast group, the routers prune that branch from the distribution tree and stop forwarding traffic down that branch.

In unicast routing, traffic is forwarded through the network along a single path from a source to the destination host according to pre-computed routes. A unicast router does not typically consider the source address; it considers only the destination address and how it would forward the traffic toward that destination. The router scans through its routing table for a match to the destination address (in many cases actually a match to a prefix forming part of the destination address) and then forwards a single copy of the unicast packet out the correct interface in the direction of the destination.

By contrast, in multicast forwarding the source is sending traffic to an arbitrary group of hosts that are represented by a multicast group address. The multicast router must determine which direction is the upstream direction (towards the root of the tree), and which one is the downstream direction (or directions). If there are multiple downstream paths, the router replicates the packet and forwards it down the appropriate downstream paths based on receiver interest. Forwarding multicast traffic away from the root, rather than to the receiver, is called Reverse Path Forwarding (RPF).

"RPF failure" is an important concept in multicast routing operation. Unicast routing techniques are used to determine a path from a receiver or intermediate node back to the tree root. Packets received via this path from the tree root are eligible for further forwarding downstream. Packets received on other interfaces not connected to this path will not be forwarded and their receipt is referred to as RPF failure. Distinguishing upstream and downstream traffic in this way is referred to as an RPF check and helps to guarantee that the distribution tree remains loop-free.

To identify the correct reverse path, PIM can exploit a wide variety of unicast routing protocols including Enhanced Interior Gateway Routing Protocol (EIGRP), Open Shortest-Path First (OSPF), Border Gateway Protocol (BGP), etc. PIM typically uses the unicast routing tables developed by such unicast routing protocols to perform the RPF function rather than constructing an independent multicast routing table.

There are a variety of PIM forwarding modes including PIM Dense Mode, PIM Sparse Mode, and Bi-Directional PIM. These exemplary PIM forwarding modes will be discussed now. Source-Specific Multicast (SSM) is also accommodated by embodiments of the present invention.

PIM Dense Mode uses a push model to initially flood multicast traffic to every corner of the network. Edge routers that have no downstream neighbors that are receivers prune back the distribution tree. The flooding pruning process repeats, e.g., every three minutes. Routers accumulate state information about the distribution tree shape by receiving datastreams through the flood and prune mechanism. These datastreams contain the source and group information so that downstream routers can build up their multicast forwarding tables. PIM Dense Mode supports only source trees and not shared trees.

PIM Sparse Mode uses a pull model to deliver multicast traffic. Only network segments with active receivers that have explicitly requested the data will receive the traffic. PIM Sparse Mode uses shared trees initially with source trees being established to increase efficiency. Sources first register with the RP and then data is forwarded from the source to the RP and down to the receivers.

In more detail, a direct neighbor (also referred to as a designated router or DR of a shared medium) of the source becomes aware of the source's transmissions and encapsulates source traffic for forwarding to the RP. Last-hop routers (i.e., routers on the shared tree that are directly connected to one or more receivers) learn about a particular source when they receive data packets on the shared tree from that source through the RP. The last-hop routers then send PIM Join messages toward the source.

When a receiver wants to join a shared tree, it sends an IGMP message to its direct neighbors. The DR among these direct neighbors reacts by noting the receiver's interest in receiving multicast packets flowing down this shared tree and by sending a Join message towards the RP if needed. The DR can also, on behalf of the receiver, switch to join the source over the SPT. A PIM Join message will then be sent toward the source.

Bi-Directional PIM is an enhancement of the PIM protocol developed to facilitate efficient many-to-many communications. Using Bi-Directional Mode, multicast groups can scale to an arbitrary number of sources with only a minimal amount of additional overhead.

The shared trees that are created in PIM Sparse Mode are unidirectional. A source tree must be created to bring the datastream to the RP (the root of the shared tree) and then it can be forwarded down the branches to the receivers. The source data cannot flow up the shared tree towards the RP. By contrast, in Bi-Directional mode, traffic is routed only along a bi-directional shared tree that is rooted at the RP. Data from the source can flow up the shared tree towards the RP and then down other branches of the shared tree to the receivers.

Multicast Routing Architecture

FIG. 1 depicts a network device 100 to which embodiments of the present invention may be applied. Linecards 102 include network interfaces for coupling to physical media. As will be discussed, forwarding intelligence is also to be found within linecards 102. Only two linecards 102 are depicted although it will be understood that there may actually be a very large number of linecards in the same network device 100. Linecards 102 are interconnected by a high-speed backplane 104 for transferring of packets. A routing processor 106 is responsible for control plane functionality. Routing processor 106 has a relatively low-speed connection to high-speed backplane 104.

A portion of the functionality of routing processor 106 may be implemented by software including instructions stored in a program memory 108. Program memory 108 is but one example of a computer-readable storage medium that can store software used when implementing embodiments of the present invention. Other examples include, e.g., hard drives, CD-ROMs, DVD-ROMs, flash memories, etc. Another example of a computer-readable storage medium is a signal that carries software across a network.

Figure 2:
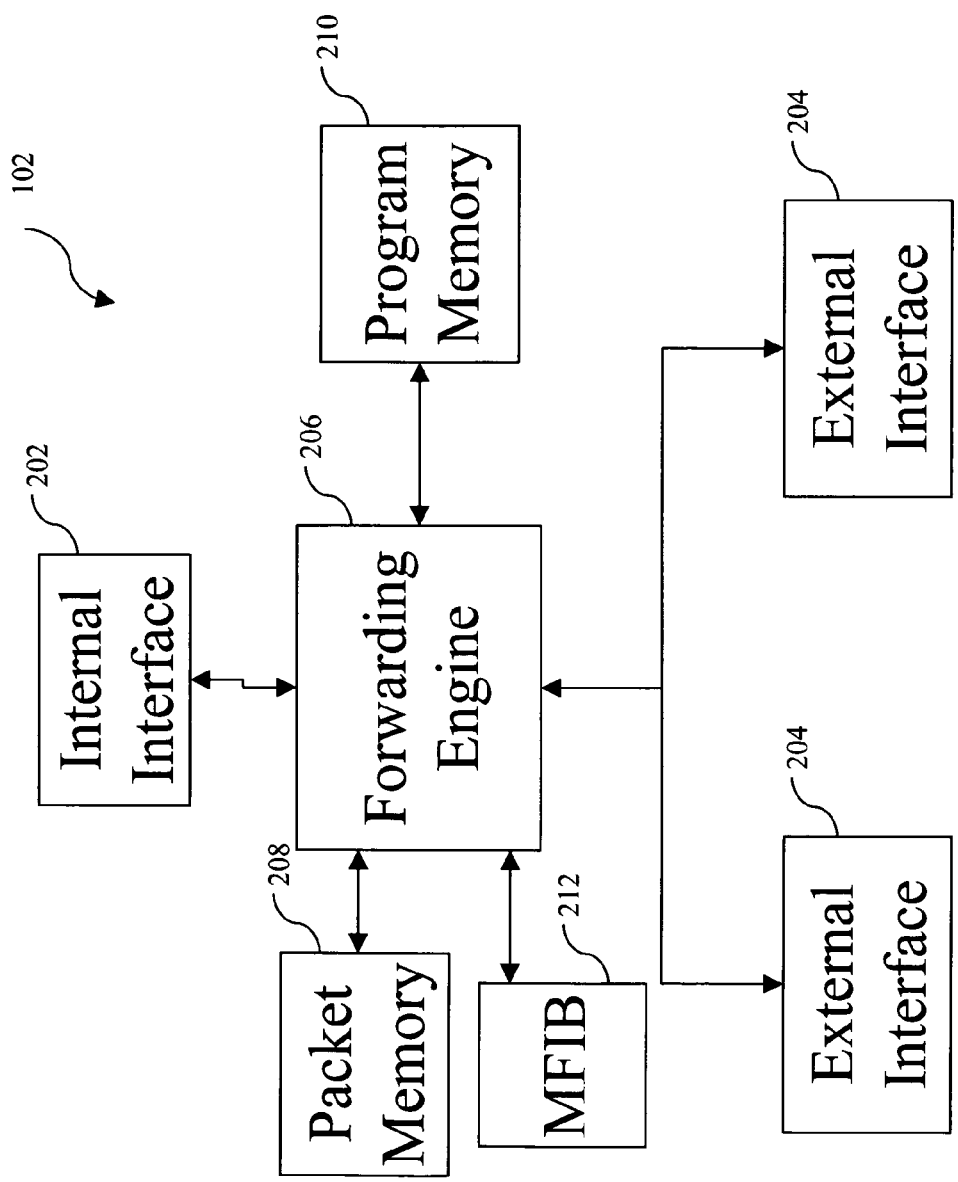
FIG. 2 depicts a linecard according to one embodiment of the present invention.

FIG. 2 depicts internal structure of a linecard 102 according to one embodiment of the present invention. An internal interface 202 couples to backplane 104 to provide connectivity to the rest of network device 100. External interfaces 204 provide access to various physical network media. External interfaces 204 may be Ethernet Interfaces, SONET interfaces, dial-up interface, data-over-cable interfaces, DSL interfaces, etc. Although only two external interfaces 204 are shown, there may be any number N of external interfaces.

A forwarding engine 206 makes forwarding decisions on individual packets, i.e., forwarding engine 206 selects the next node to which a received packet is to be forwarded and the linecard/interface of network device 100 to which the packet will be transferred for forwarding to this selected next node. In certain implementations employing a distributed architecture, forwarding engine operations may be divided between the linecard receiving the packet ("ingress linecard") and the linecard relaying the packet toward its destination ("egress linecard").

Intermediate storage of packets is provided by a packet memory 208. A program memory 210 may be used to store software instructions useful in implementing forwarding engine 206. Instructions for implementing any portion of forwarding engine 206 can be stored in any computer-readable storage medium as was discussed in reference to program memory 108 of FIG. 1. In making forwarding decisions, forwarding engine 206 consults a multicast forwarding table, MFIB 212.

According to embodiments of the present invention, the control and forwarding planes for multicast routing operation of network device 100 are kept separated. Routing processor 106 operates the control plane and maintains awareness of multicast protocol context without handling data packets to be forwarded. To support multicast routing operation, routing processor 106 maintains a Multicast Routing Protocol Topology Table (MRPTT). When necessary for protocol operation, forwarding engine 206 (replicated in all of the linecards) signals routing processor 106 by identifying a particular MFIB entry and associated interface of which routing processor 106 should be aware to appropriately update its protocol context. The signaling mechanism preferably minimizes signaling to routing processor 106. Forwarding engine 206 preserves packets for which forwarding information is either missing or incomplete in the MFIB until such forwarding information becomes available in the MFIB. To condition MFIB signaling and implement correct multicast routing protocol operation, routing processor 106 appropriately annotates the contents of MFIB 212. Routing processor 106 and forwarding engine 206 are modularly distinct from one another, interacting via modification and monitoring of the contents of MFIB 212.

Forwarding engine 206 employs a multicast-routing-protocol-independent state transition scheme to determine the disposition of each received multicast packet. A given multicast packet can be forwarded, dropped, preserved, or copied to a host application, as needed. Forwarding engine 206 operates without awareness of protocol context, making decisions on individual packets based on MFIB entries as controlled by routing processor 106. The forwarding logic is believed to accommodate all known multicast routing protocols without modification.

Thus, the multicast forwarding engine implementation may be ported, customized, optimized, distributed and evolved independently of variations in multicast routing protocols. Furthermore, the multicast routing protocols themselves may be changed by changing the operation of the routing processor and without the need for any change in the operation of the forwarding engine that follows the state transition described herein.

Forwarding Engine Operation

Figure 3:
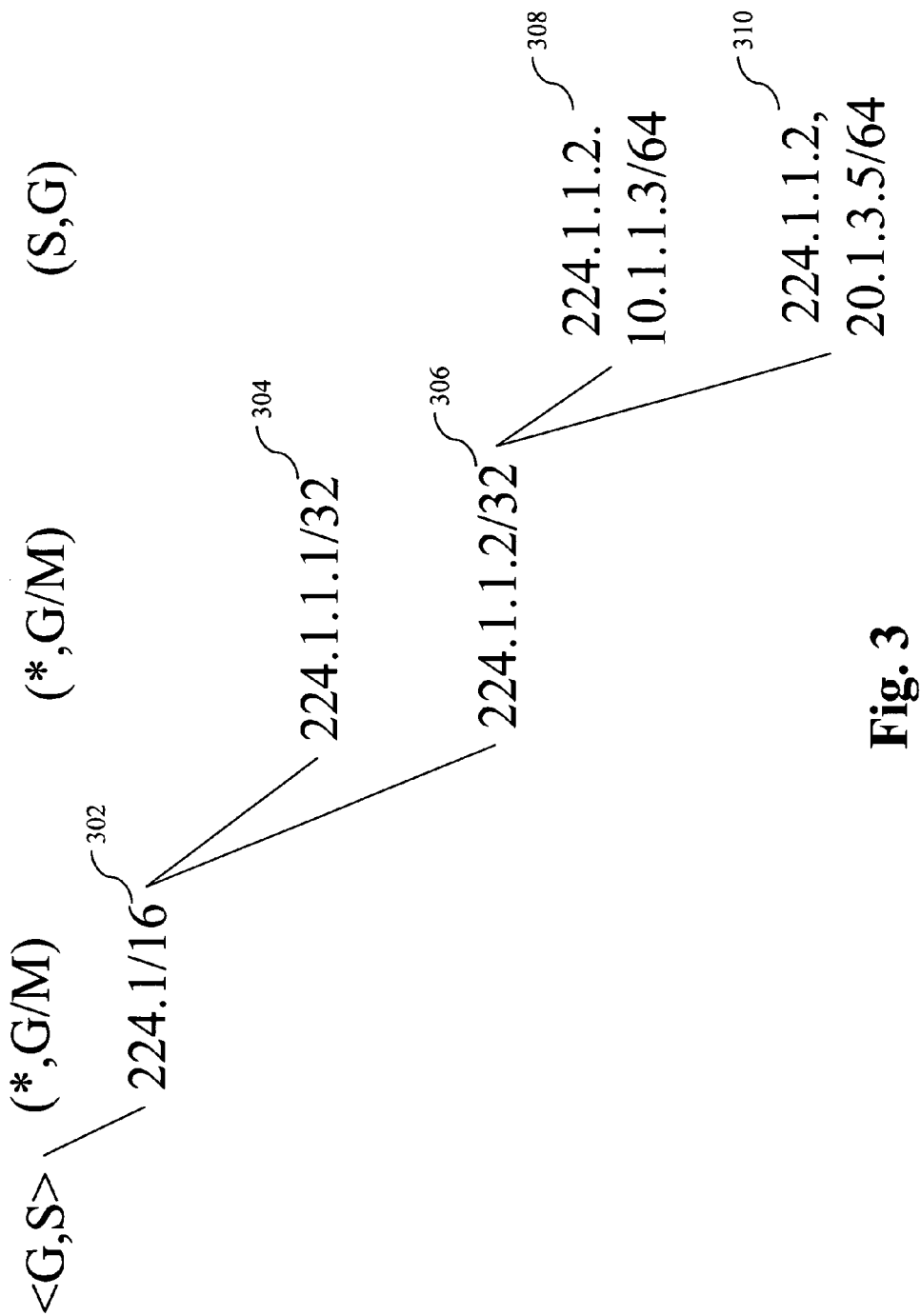
FIG. 3 depicts a multicast FIB (MFIB) according to one embodiment of the present invention.

Before proceeding further, it will be useful to understand the structure of MFIB 212. FIG. 3 depicts the structure of MFIB 212 according to one embodiment of the present invention. The MFIB has a tree structure to facilitate finding a best match to the group and source address of a multicast packet. In a unicast routing table, the entries used for matching purposes are typically address prefixes. Each prefix is denoted by an address and a mask which indicates how many of the most significant bits of the address form the prefix to be used for matching purposes. When the unicast packet is to be forwarded, the destination address is compared to the prefix entries in the forwarding table to find the entry with the longest prefix that still matches the corresponding most significant bits of the destination address. To perform this match, both the destination address and the address value in the table to be matched are ANDed with a mask which includes "1" values at the lower significant bits that do not form a part of the prefix.

The MFIB of FIG. 3 operates in a similar way. Here, however, the matches are to a combination of group prefix (as indicated by group address and mask) and source address. For the purposes of matching, the source address can be viewed as an extension to the group address. A match to a combination group and source entry is regarded as a longer (and thus "better") match than a match to a (*, G/M) entry which does not require a source match.

FIG. 3 depicts selected entries of such an MFIB according to one embodiment of the present invention. To facilitate longest prefix matching, the longest match will be the matching entry that is furthest into the tree. A first entry 302 corresponds to a group address of 224.1.0.0 with the first 16 bits being the prefix for matching purposes. The source address is a "don't care" for matching purposes. At one layer deeper into the tree are found two entries 304 and 306 which hang from entry 302. Entry 304 has a group address of 224.1.1.1 and entry 306 has a group address of 224.1.1.2. For both entries 304 and 306, all 32 bits of the entry are used for matching purposes while the source address remains a "don't care." Hanging from entry 306 are two further entries 308 and 310. Entries 308 and 310 share the same group address as 306 but entry 308 specifies a source address of 10.1.1.3 while entry 310 specifies a source address of 20.1.3.5. For entries 308 and 310, all 64 bits of the concatenated source and group address are used for matching purposes. It will of course be understood that most MFIB implementations include very large numbers of entries and that a limited number of entries has been shown in FIG. 3 only for clarity of illustration.

According to embodiments of the present invention, each entry in the MFIB may have various flags set or cleared. Some of these flags apply to the entry as a whole. Other flags are specific to both the entry and one of the designated interfaces of network device 100. FIG. 4 depicts details of a particular entry. Flags designated IA, DS, DSS, C, and X may be set or cleared for the entry as a whole. Flags designated as SP, A, F, NS, NSS, and IC are set and cleared for particular interfaces. Interfaces can include physical interfaces, IP layer interfaces, or any interface to a software-created tunnel.

The meaning of the flags will now be briefly discussed. This will be followed by examples of operation of the forwarding engine state machine in various multicast routing scenarios.

A: The A flag indicates whether multicast packets matching the entry are to be accepted on a particular interface.

F: The F flag indicates whether accepted multicast packets matching the entry are to be forwarded on a particular interface. If the packet arrived on that interface, however, the F flag will be ignored.

SP: The SP flag is used to signal the routing processor of the arrival of a data packet. The routing processor will then also be aware of the source, group, and receiving interface of this data packet. The routing processor may determine based on a combination of awareness of the data packet arrival and knowledge of current protocol context that it should update multicast protocol state, update the MFIB, etc. Examples of data packet arrival events that would lead to such action on the part of the routing processor include, e.g., arrival on an interface of a PIM Dense Mode multicast packet from a new source, an RPF failure, etc. The forwarding engine itself is unaware of protocol state but knows when it should signal the routing processor by using the SP flag.

When another data packet arrival occurs that would normally result in a signal the fact that the SP flag has already been sent prevents an additional signal from being sent to the routing processor. Hence signals for this (*,G/M) or combination of source, group, and interface (S,G,I) are filtered until the routing processor clears the SP flag on a specific interface of the appropriate entry. The routing processor will choose when it clears the SP flag. The SP flag is the only flag in the described implementation that is set by the forwarding engine and cleared by the routing protocol. All of the other described flags are both set and cleared by the routing protocol.

DS and NS: These flags are set and cleared by the routing processor to control the behavior of the forwarding engine in setting the SP flag. The DS flag is set and cleared to control signaling for the entry as a whole. The NS flag is used to negate the DS value for a particular interface. If DS (for the matching entry) xor NS (for the receiving interface on the matching entry) is set, then signaling is prevented. If both DS and NS are set or neither are set, then signaling may occur.

DSS and NSS: The routing processor uses these flags to selectively force signaling to occur on a newly created source entry rather than the matching (*,G/M) entry. This allows new source discovery and appropriate creation of source-specific state information. The packet should then be preserved so that it can be reprocessed by the forwarding engine based on a match to the new entry. The DSS flag is set and cleared for the entry as a whole. The NSS flag is set to negate the DSS value for a particular interface.

C: The routing processor will set this flag in certain situations where it is desired for the forwarding engine to check if the packet source is in direct connection. This is relevant in certain multicast routing situations such as when this network device is the designated router (DR) on a shared medium for detecting a new source in a PIM Sparse Mode distribution network.

IC: In certain situations, a copy of the packet should be made for a host application operating on network device 100. The IC flag is used to help determine when such a copy should be made and sent to the application via the stack. For example, network device 100 may be acting in certain situations both to forward the packet and to process the packet's contents at the application layer. An example would be the operation of RP Discovery Protocol to automatically discover an RP.

IA: The IA flag is very useful in PIM Bi-Directional mode. The IA flag prompts the forwarding engine to look to a parent entry to determine whether or not to accept multicast packets on a particular interface even if the A flag for that interface is not set.

X: The X flag is set solely for the purpose of creating an entry. For example, at configuration time, the routing processor will set the X flag for all entries identifying groups that operate under PIM Dense Mode.

Figure 5:
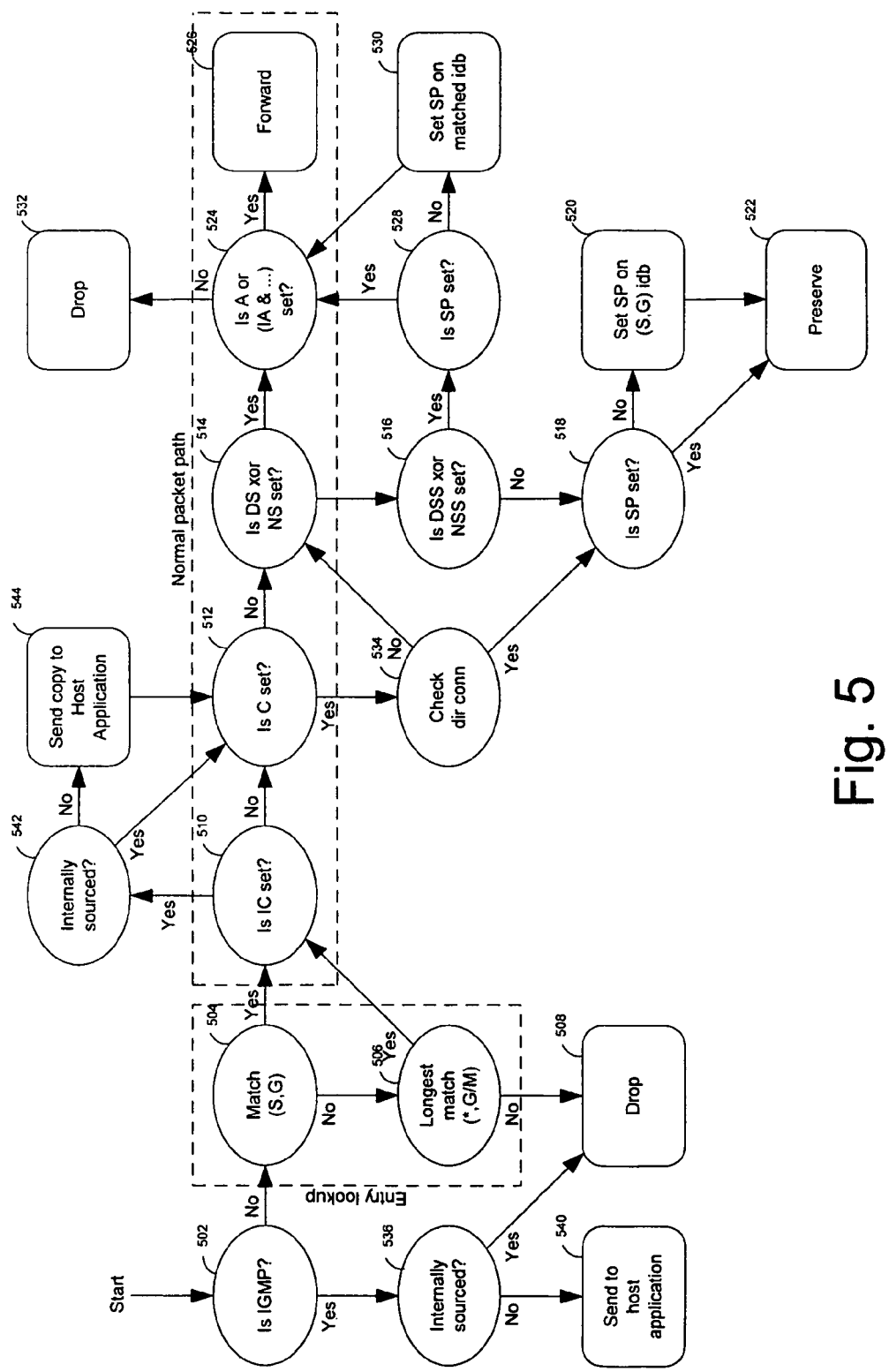
FIG. 5 is a state diagram depicting operation of a multicast forwarding engine according to one embodiment of the present invention.

FIG. 5 depicts a state transition diagram for a multicast forwarding engine according to one embodiment of the present invention. FIG. 5 describes handling of a single received multicast packet. Possible dispositions of the multicast packet include: dropping the packet, forwarding the packet, preserving the packet to allow the routing processor to adjust control state prior to forwarding, or making a copy of the packet for use by a local host application. Operations will be described with reference to several exemplary multicast routing scenarios.

As the state transition diagram is traversed, there is a complex interaction between MFIB flag setting and forwarding entry creation and deletion. Creation and deletion of entries is implicit in some cases. When there is information (a flag) that needs to be maintained on an entry then the entry exists. If there are no flags then the entry is deleted. If a flag is set where none were set before, than an entry, or an interface on an entry, is created.

PIM Dense Mode Route Creation

The first example will focus on a router receiving a PIM Dense Mode multicast packet from a new source. At state 502, the forwarding engine tests whether the received packet is in fact an IGMP control packet. Since this packet is in fact a multicast packet from a new PIM Dense Mode source, the test result is no and processing proceeds to state 504. State 504 looks for the (S,G) address of the received multicast packet in the MFIB to find a match. Since this is the first multicast packet received from the source, there is no existing (S,G) entry and the matching process proceeds to a state 506.

State 506 attempts to find a longest match to a (*,G/M) entry in the MFIB. There is in fact a match to an entry that was created (by setting the X flag on it) when the multicast routing protocol was configured. This entry identifies all the groups or a range of groups that operate under PIM Dense Mode and have similar behavior. If there had been no entry, then the packet would have been dropped at state 508. Since there is in fact a matching (*,G/M) entry, processing proceeds to a state 510. State 510 tests whether the IC flag is set on the matching entry for the interface that received the multicast packet. This matched entry has no interface information and all the interface flags are clear so processing proceeds to a state 512 to test the C flag. The C flag is also clear so processing proceeds to a state 514.

State 514 tests the DS and NS flags which control whether or not SP signaling can occur. Since both flags are clear, state 516 is reached. State 516 tests the DSS and NSS flags. These flags control whether the SP flag should be set on the matched entry or on an (S, G) entry which may need to be created for the purposes of signaling. Signaling on the matched entry would not communicate the full (S,G,I) information inherent in receipt of a multicast packet. In this situation, both the DSS and NSS flags are clear so processing proceeds to a state 518 which checks whether the SP flag is set on the interface receiving the multicast packet. Since this is the first packet from the source, there has not been a previous signal and therefore the SP flag is clear. In fact, the (S, G) entry does not exist at all meaning that all of its flags are implicitly clear.

This leads to a state 520 that sets SP for the receiving interface on an entry corresponding to the (S,G) address of the received packet. Since this is now a non-existent interface on a non-existent entry, both the entry and the interface are created as a part of setting the flag. The routing processor is therefore notified of a data arrival event and of the full (S,G,I) information for the received packet. Then at state 522, the packet is preserved. The received packet is kept by the forwarding engine and associated with the (S,G) entry and interface. The reason for preservation is that the routing processor has not yet populated the MFIB entry with information as to how to forward the packet. There are not yet any interfaces with A and F flags set on the new entry. The packet is preserved to give the routing processor an opportunity to further populate the new MFIB entry. Once the routing processor has cleared the SP flag, that will indicate it has adjusted the MFIB contents and signal the forwarding engine that it is time to forward the packet based on the new information as will be described.

Subsequent packets having the same (S,G) address and arriving on the same interface will match at state 504 and will proceed in the same way through states 510, 512, 514, and 516 but will test positively at state 518, thus skipping the signaling state and going directly to the preservation of the packet at state 522. This is a good example of how the forwarding engine filters unnecessary signaling from reaching the routing processor. The routing processor is already aware of the new source and need not be re-notified.

Now let us consider details of the routing processor's reaction to the setting of the SP flag. The routing processor is now aware that a data packet has arrived from source S, the packet is destined for group G, and that it arrived on interface I. It is aware that G is in a range corresponding to PIM Dense Mode. Note that the forwarding engine is not aware that this is a Dense Mode packet or that G corresponds to a Dense Mode group. The routing processor checks if the interface that the packet arrived on is on the reverse path towards the source. Assuming that the interface is on the reverse path to the source and that the RPF check has passed, the router determines that the packet should be forwarded downstream. To achieve this downstream forwarding, the routing processor populates the new (S, G) entry on all of the MFIBs in the network device. The A flag on the receiving interface is set. The F flag is set on all the interfaces known to be configured for multicast routing. Setting the F flags will involve creating new interfaces since only the receiving interface had been previously created for the purpose of setting the SP flag.

Default signaling behavior is specified for this (S, G) entry, thus the DS flag is kept clear. This behavior is appropriate for Dense Mode forwarding interfaces since the routing processor will want to know when a packet arrives on interfaces where we are normally forwarding. However, the routing processor does not want to be signaled for every new packet arriving on the accepting interface. Thus on the accepting interface, the routing processor sets the NS flag. The NS flag changes the default entry behavior on the accepting interface and prevents the forwarding engine from signaling received packets. This is another example of filtering unnecessary signaling.

Also, the DSS flag is set for the entry. This essentially signifies that packets arriving on a forwarding interface will be signaled on a matched entry. They, however, will not be preserved. The rationale behind the DSS\NSS flags is that if the target entry already exists, then the routing processor has populated it with forwarding information. Therefore, it will not be surprised with packets arriving in the wrong interface and will not need to have them preserved.

Having populated the entry with all the flags needed to control forwarding and signaling, the routing processor signals the forwarding engine that it is done. It does this by clearing the SP flag that was set by the forwarding engine when the original packet was received. The final entry, assuming three multicast interfaces, is then:

(S, G) Set Flags: DSS.
IF1 Set Flags: A, F, NS
IF2 Set Flags: F
IF3 Set Flags: F When the forwarding engine sees that the SP flag has been cleared, it will release all the preserved packets that were queued on the interface for which the SP flag was set. These packets will again be passed through a simplified version of the FIG. 5 state transition diagram. The simplified version just performs the entry look-up to match to the (S,G) entry, checks if the A flag is set on the receiving interface, and if so forwards the packet. The A flag is tested at state 524 and forwarding occurs at state 526. The forwarding action means that the forwarding engine outputs a copy of the packet on every interface with a set F flag on the matched entry except for the receiving interface.

Subsequent packets arriving on this accepting interface (also referred to as the RPF interface) and matching the (S, G) entry that has been established will traverse states 502, 504, 510, 512, and 514. However, since the NS flag is set on the RPF interface, processing proceeds to state 524 after state 514. State 524 determines that the A flag is in fact set on the accepting interface, and the packet is then forwarded on the appropriate interfaces at state 526.

RPF Failure for Dense Mode

As was described above, an RPF failure signifies that a packet arrives on an interface that is not the one where packets from this source and group are expected to arrive. In this event, the routing processor should be signaled to take appropriate protocol action to potentially stop the node that forwarded the errant packet. Let us assume a packet arrives on the wrong interface for the entry that was created on the above example.

At state 504, the (S,G) entry is matched. The IC and C flags are determined to be clear at states 510 and 512. State 514 determines that DS is clear on the entry and NS is clear on this interface. However, DSS is set for the entry and NSS is clear for this receiving interface. Therefore, after state 516, processing proceeds to a state 528 which tests whether the SP flag is set on the receiving interface. Since the SP flag is in fact clear on that interface, processing proceeds to a state 530 that sets the SP flag. Then state 524 is reached where the A flag is tested. Since the A flag is clear (this is not the accepting interface), the packet is dropped at a state 532.

Because the SP flag has been set, the routing processor is now aware of a packet arrival event for a particular interface and a particular (S, G) address. In combination with the current multicast protocol context, the routing processor determines that the packet should not have been transmitted. In response to this, the routing processor takes action, sending appropriate PIM control messages to stop the errant transmissions and then clearing the SP flag. If more RPF failure packets arrive at the same interface before the SP flag is cleared, they will end up being dropped without further signaling since state 524 will follow state 528 without any traversal of state 530. This is another example of signal filtering.

Bi-Directional PIM Forwarding

Bi-Directional PIM has no data-driven protocol events. The routing processor populates the MFIB with A, F, and IA flags so that the router acts appropriately within the Bi-Directional shared tree.

One aspect of Bi-Directional PIM operation is the use of a Designated Forwarder (DF) election mechanism to elect a single router on each link for particular responsibilities. The elected router is referred to as the DF. The DF is responsible for picking up packets from the link and forwarding them upstream towards the rendezvous point (RP). Also, the DF is responsible for forwarding downstream traveling packets from the RP onto the same link provided an appropriate Join message has been received for the group to which the packets are addressed.

For a particular range of possible bi-directional mode groups, the DF election results are reflected in the MFIB after all DF elections are complete for each link in a network and before any source begins transmitting or any receiver joins a group. Thus, all routers have a (*,G/M) entry that has A set on all interfaces on which the router has won the DF election to forward packets towards the RP. The F flag is set on the interface that points towards the RP. This interface also has its A flag set to accommodate downstream traffic from the RP.

When a source begins transmitting, data packets will match the (*,G/M) entries on each router and get forwarded all the way to the RP. No signals are generated and the routing processor therefore need not be involved. Referring to FIG. 5, the forwarding engine traverses states 502, 504, 506, 510, 512, 514, and 524 before reaching state 526 to forward the packet in the direction of the rendezvous point. When a receiver joins the group, it sends an IGMP Join to a last-hop router adjacent to the receiver. Within this first-hop router, the IGMP Join is transferred to the routing processor which reacts by creating an (*,G) entry which has the F flag set on the receiver-facing interface. As packets for this group still need to be forwarded towards the RP, the F flag is also set on the interface that faces the RP.

The new (*,G) entry is a "child" of the previously discussed (*,G/M) entry. The new entry does not have any interfaces for which the A flag has been set. Instead, the IA flag is set for the entry. This instructs the forwarding engine to inherit accepting information from the parent entry. So when a matching data packet encounters state 524, because of the presence of the set IA flag, the (*,G/M) entry will be consulted to see if the packet should be accepted for forwarding or dropped. Also, this router relays the Join message to the next-hop router along the tree toward the rendezvous point. This next-hop router also creates a similar (*, G) entry.

PIM Sparse Mode Source Registry to Rendezvous Point

When a source begins transmitting onto a shared medium, one of the routers on the shared medium is designated to encapsulate source traffic and transmit it to the rendezvous point for distribution on the Sparse Mode shared tree. To accommodate this type of operation, the routing processor of a so-designated router will set the C flag on a (*, G/M) entry for which Sparse Mode operation has been configured. When a source's first Sparse Mode multicast packet is received, the forwarding engine traverses state 502, finds no (S,G) match at state 504, does find a (*, G/M) match at state 506, does not find the IC flag to be set at step 510, but does find the C flag to be set at 512. Then at a state 534, the forwarding engine determines whether this packet has been received over a direct connection indicating that this router will in fact be responsible for encapsulation and tunneling. If it has not been received via a direct connection, processing proceeds to state 514.

If it is a direct connection, then the SP flag is tested on the (S, G) entry for the receiving interface. Of course, since this entry does not yet exist, the SP flag is deemed to be not set, and processing proceeds to state 520 where the forwarding engine sets SP for the receiving interface on a newly created (S, G) entry. The packet is then preserved at state 522.

The routing processor, now being aware that an event has been signaled on a group address corresponding to Sparse Mode operation, reacts by adding a virtual interface on the new (S,G) entry. This virtual interface will be used to tunnel packets to the rendezvous point and thus the A flag is set on this interface. The NS flag may also be set to filter further signals. The SP flag is then cleared and the forwarding engine responds by passing the preserved packet through the state transition diagram. The A flag will have been set on the receiving interface and the F and NS flags will have been set on the virtual interface that implements the tunnel so the packet will be tunneled through to the rendezvous point. Subsequent packets received on that interface for that (S, G) entry will also be tunneled in this way.

Miscellaneous Scenarios

Received IGMP messages exit state 502 to reach a state 536. State 536 tests whether these messages have been sourced internally. If they have been sourced internally, they are dropped at state 508 since they do not require further processing. If they have not been sourced internally then state 540 sends them to an appropriate host application operating on the routing processor for handling.

In certain scenarios where the network device is acting to both forward data and process the same data at the application layer, the forwarding engine will make an internal copy of the packet and sent it to a host application. The routing processor sets the IC flag for the entries for which this behavior is desired. Thus if the IC flag is determined to be set at state 510, then a state 542 determines whether the packet has been internally sourced. If the packet has been internally sourced, normal operation resumes with the transition to state 512. If the packet has not been internally sourced, then a state 544 sends a packet to a host application before resuming normal operation at state 512.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, the present invention is not only related to handling multicast protocols but can also be used to simplify the implementation of other data-driven protocols such as ARP resolution and NAT (Network Address Translation).

The invention claimed is:

1. A method of operating a network device comprising:
   receiving a multicast packet at a forwarding engine;
   selecting a disposition of the received packet based on a plurality of multicast operation flags in a forwarding table, wherein said forwarding engine is unaware of multicast protocol state and entries in the forwarding table are controlled by a control plane processor;
   based on examination of one or more of said multicast operation flags,
   signaling from said forwarding engine to said control plane processor to facilitate maintenance of said multicast protocol state at said control plane processor; and
   updating the forwarding table by said control plane processor in response to said signaling from said forwarding engine, wherein updating the forwarding table comprises setting or clearing one or more of said multicast operation flags at the forwarding table;
   wherein said forwarding engine and said control plane processor are modularly distinct from one another and interact via modification and monitoring of the forwarding table, said control plane processor configured to maintain awareness of said multicast protocol state without handling the multicast packet; and
   wherein the control plane processor sets and clears selected ones of said multicast operation flags to filter signaling from said forwarding engine to said control plane processor.

2. The method of claim 1 wherein selecting a disposition of the received packet comprises querying said forwarding table.

3. The method of claim 2 further comprising:
   using said control plane processor to populate said forwarding table based on protocol context.

4. The method of claim 1 wherein at least one of said plurality of multicast flags is configured to indicate whether a multicast packet is received on a receiving interface, whether said multicast packet is forwarded on a particular interface, and whether the forwarding engine signals the routing processor of receipt of said multicast packet.

5. The method of claim 1 wherein signaling comprises creating an entry corresponding to an (S, G) address of a multicast packet and setting a signal present flag of said created entry.

6. The method of claim 1 wherein said plurality of multicast flags comprises a first multicast operation flag specific to a selected entry of said multicast forwarding table but generic to interfaces of said network device and a second multicast operation flag specific to said selected entry and specific to a selected interface of said network device.

7. The method of claim 1 wherein signaling comprises setting a signal present flag of an entry in a forwarding table at said forwarding engine.

8. The method of claim 1 wherein said selected disposition belongs to a group comprising forwarding said packet, preserving said packet if forwarding information is missing or incomplete in the forwarding table, and dropping said packet.

9. The method of claim 1 further comprising:
   based on examination of one or more of said multicast operation flags, signaling the routing processor of receipt of said multicast packet.

10. A non-transitory computer-readable storage medium encoded with a computer program for operating a network device to forward information, said computer program comprising:
    code that selects at a forwarding engine a disposition of a received multicast packet based on a plurality of multicast operation flags in a forwarding table, wherein said forwarding engine is unaware of multicast protocol state and entries in the forwarding table are controlled by a control plane processor;

code that signals from said forwarding engine to a control plane processor to facilitate maintenance of said multicast protocol state at said control plane processor based on examination of one or more of said multicast operation flags; and code that updates the forwarding table by said control plane processor in response to said signaling from said forwarding engine, wherein updating the forwarding table comprises setting or clearing one or more of said multicast operation flags at the forwarding table;

wherein said forwarding engine and said control plane processor are modularly distinct from one another and interact via modification and monitoring of the forwarding table, said control plane processor configured to maintain awareness of said multicast protocol state without handling the multicast packet; and wherein the control plane processor sets and clears selected ones of said multicast operation flags to filter signaling from said forwarding engine to said control plane processor.

11. The computer-readable storage medium of claim 10 wherein said code that selects a disposition of the received packet comprises code that queries a forwarding table.

12. The computer-readable storage medium of claim 11 further comprising:

code that, uses said control plane processor to populate said forwarding table based on protocol context.

13. The computer-readable storage medium of claim 10 wherein at least one of said plurality of multicast flags is configured to indicate whether a multicast packet is received on a receiving interface, whether said multicast packet is forwarded on a particular interface, and whether the forwarding engine signals the routing processor of receipt of said multicast packet.

14. The computer-readable storage medium of claim 10 wherein code that signals comprises code that creates an entry corresponding to an (S, G) address of a multicast packet and sets a signal present flag of said created entry.

15. The computer-readable storage medium of claim 10 wherein said plurality of multicast flags comprises a first multicast operation flag specific to a selected entry of said multicast forwarding table but generic to interfaces of said network device and a second multicast operation flag specific to said selected entry and specific to a selected interface of said network device.

16. The computer-readable storage medium of claim 10 wherein code that signals comprises code that sets a signal present flag of an entry in a forwarding table at said forwarding engine.

17. Apparatus for operating a network device to forward information, said apparatus comprising:

a forwarding engine for selecting a disposition of a received multicast packet and signaling to a control plane processor to facilitate maintenance of said multicast protocol state at said control plane processor, based on multicast operation flags in a forwarding table, wherein said forwarding engine is unaware of multicast protocol state; and said control plane processor for updating the forwarding table in response to said signaling from said forwarding engine, wherein updating the forwarding table comprises setting or clearing one or more of said multicast operation flags at the forwarding table and wherein said control plane processor is configured to maintain awareness of said multicast protocol state without handling the multicast packet;

wherein said forwarding engine and said control plane processor are modularly distinct from one another and interact via modification and monitoring of the forwarding table, and said control plane processor sets and clears selected ones of said multicast operation flags to filter signaling from said forwarding engine to said control plane processor.

18. The apparatus of claim 17 wherein selecting a disposition comprises querying said multicast forwarding table.

19. The apparatus of claim 17 wherein said selected disposition belongs to a group comprising forwarding said packet, preserving said packet if forwarding information is missing or incomplete in the forwarding table, and dropping said packet.

20. The apparatus of claim 17 wherein signaling comprises signaling the control plane processor of the arrival of a data packet only if a signaling flag is set in the forwarding table.

* * * * *